US00RE48292E

(19) United States
(12) Reissued Patent
Zhang et al.

(10) Patent Number: US RE48,292 E
(45) Date of Reissued Patent: Oct. 27, 2020

(54) METHOD FOR TRANSMITTING AND RECEIVING SOUNDING SIGNAL, BASE STATION AND USER EQUIPMENT

(71) Applicant: Huawei Technologies Co., Ltd., Shenzhen, Guangdong (CN)

(72) Inventors: Wen Zhang, Shenzhen (CN); Yongxia Lv, Ottawa (CA)

(73) Assignee: HUAWEI TECHNOLOGIES CO., LTD., Shenzhen (CN)

(21) Appl. No.: 16/361,219

(22) Filed: Mar. 22, 2019

Related U.S. Patent Documents

Reissue of:
(64) Patent No.: 9,609,643
Issued: Mar. 28, 2017
Appl. No.: 14/619,676
Filed: Feb. 11, 2015

U.S. Applications:
(63) Continuation of application No. PCT/CN2012/080160, filed on Aug. 15, 2012.

(51) Int. Cl.
*H04J 3/00* (2006.01)
*H04W 72/04* (2009.01)
(Continued)

(52) U.S. Cl.
CPC ..... *H04W 72/042* (2013.01); *H04L 5/0048* (2013.01); *H04W 68/00* (2013.01)

(58) Field of Classification Search
CPC ..... H04W 72/042
See application file for complete search history.

(56) References Cited

U.S. PATENT DOCUMENTS

2007/0133458 A1* 6/2007 Chandra ..... H04L 1/0025 370/329
2010/0215011 A1* 8/2010 Pan ..... H04L 5/0064 370/329
(Continued)

FOREIGN PATENT DOCUMENTS

CN 102075298 A 5/2011
CN 102474857 A 5/2012
(Continued)

OTHER PUBLICATIONS

XP050419384 R1-102054 Research in Motion et al:"Design and Configuration Considerations on Aperiodic SRS for LTE-A", Apr. 6, 2010.
(Continued)

*Primary Examiner* — Robert L Nasser
(74) *Attorney, Agent, or Firm* — Huawei Technologies Co., Ltd.

(57) ABSTRACT

Embodiments of the present invention provide a method for transmitting a sounding signal, a base station and a user equipment, including: receiving a trigger message transmitted by a base station, where the trigger message comprises instruction information, the instruction information is used for instructing at least one UE in a group of user equipments UEs to transmit a sounding signal, and the group of user equipments comprises at least two user equipments; and transmitting the sounding signal to the base station according to the instruction information. According to the method for transmitting the sounding signal, the base station and the user equipment provided by embodiments of the present invention, an eNodeB may trigger at least one UE in a group of UEs to transmit a sounding signal according to a certain rule on a PDCCH, thereby improving efficiency.

26 Claims, 4 Drawing Sheets

(51) Int. Cl.
*H04L 5/00* (2006.01)
*H04W 68/00* (2009.01)

(56) References Cited

U.S. PATENT DOCUMENTS

| | | | | |
|---|---|---|---|---|
| 2010/0246561 | A1* | 9/2010 | Shin | H04W 52/32 370/345 |
| 2011/0075624 | A1* | 3/2011 | Papasakellariou | H04W 48/10 370/329 |
| 2011/0085513 | A1* | 4/2011 | Chen | H04W 72/042 370/330 |
| 2011/0243262 | A1* | 10/2011 | Ratasuk | H04L 5/003 375/260 |
| 2012/0014349 | A1* | 1/2012 | Chung | H04B 7/0684 370/329 |
| 2012/0044906 | A1 | 2/2012 | Chen et al. | H04L 5/001 370/329 |
| 2012/0163320 | A1 | 6/2012 | Akimoto et al. | |
| 2012/0257582 | A1* | 10/2012 | Damnjanovic | H04L 5/001 370/329 |
| 2013/0156014 | A1* | 6/2013 | Kim | H04L 5/0051 370/336 |

FOREIGN PATENT DOCUMENTS

| | | | |
|---|---|---|---|
| CN | 102594538 | A | 7/2012 |
| WO | 2011083746 | A1 | 7/2011 |
| WO | WO 2011083746 | A1 | 7/2011 |
| WO | 2012044846 | A1 | 4/2012 |
| WO | WO 2012044846 | A1 | 4/2012 |

OTHER PUBLICATIONS

XP050449143 R1-103711 Texas Instrumentsi:Outstanding issues on dynamic aperiodic SRS, Jun. 22, 2010.

XP050450449 R1-105270 Sharp:"Details of Dynamic Aperiodic SRS configuration", Oct. 5, 2010.

XP050598884 R1-106375 Qualcomm Incorporated:"Further details on aperiodic dynamic SRS", Nov. 9, 2010.

"Further details on aperiodic dynamic SRS," 3GPP TSG RAN WG1, Meeting #63, Jacksonville, Florida, R1-106375, 3rd Generation Partnership Program, Valbonne, France (Nov. 15-19, 2010).

"Details of Dynamic Aperiodic SRS configuration," 3GPP TSG RAN WG1, Meeting #62bis, Xi'an, China, R1-105270, 3rd Generation Partnership Program, Valbonne, France (Oct. 11-15, 2010).

"Design and Configuration Considerations on Aperiodic SRS for LTE-A," 3GPP TSG RAN WG1, Meeting #60bis, Beijing, China, R1-102054, 3rd Generation Partnership Program, Valbonne, France (Apr. 12-16, 2010).

"Outstanding issues on dynamic aperiodic SRS," 3GPP TSG RAN WG1, Meeting #61bis, Dresden, Germany, R1-103711, 3rd Generation Partnership Program, Valbonne, France (Jun. 28-Jul. 2, 2010).

* cited by examiner

METHOD FOR TRANSMITTING AND RECEIVING SOUNDING SIGNAL, BASE STATION AND USER EQUIPMENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is *a Reissue Application of U.S. Pat. No. 9,609,643 B2 on Mar. 28, 2017, which is* a continuation of International Patent Application No. PCT/CN2012/080160, filed Aug. 15, 2012, which is hereby incorporated by reference in its entirety.

TECHNICAL FIELD

The present invention relates to the field of communication technologies and, in particular, to a method for transmitting and receiving a sounding signal, a base station and a user equipment.

BACKGROUND

In a long term evolution (abbreviated as LTE) system, a user equipment (abbreviated as UE) is required to transmit a sounding signal to an evolved base station (Evolved NodeB, abbreviated as eNodeB), so that the eNodeB can perform an uplink channel estimation according to the sounding signal.

In the prior art, procedures of triggering an UE to transmit a sounding signal by an eNodeB are: the eNodeB transmits a physical downlink control channel (abbreviated as PDCCH) to the UE, where the PDCCH bears downlink control information (abbreviated as DCI). Once the UE has detected the DCI borne by the PDCCH, the UE can transmit the sounding signal to the eNodeB.

Nevertheless, in the prior art, an eNodeB can only trigger one UE to transmit a sounding signal on a PDCCH, the efficiency is comparatively low.

SUMMARY

Embodiments of the present invention provide a method for transmitting and receiving a sounding signal, a base station and a user equipment.

In one respect, embodiments of the present invention provide a method for transmitting a sounding signal, including:

receiving a trigger message transmitted by a base station, where the trigger message includes instruction information, the instruction information is used for instructing at least one UE in a group of user equipments UEs to transmit a sounding signal, and the group of user equipments includes at least two user equipments; and transmitting the sounding signal to the base station according to the instruction information.

In one respect, embodiments of the present invention provide a method for receiving a sounding signal, including:

transmitting a trigger message to at least one UE in a group of user equipments UEs, where the trigger message includes instruction information, and the instruction information is used for instructing the at least one UE to transmit a sounding signal, and the group of user equipments includes at least two user equipments; and receiving the sounding signal transmitted by the at least one UE according to the instruction information.

In another respect, embodiments of the present invention provide a user equipment, including:

a first receiving module, configured to receive a trigger message transmitted by a base station, where the trigger message includes instruction information, the instruction information is used for instructing at least one UE in a group of user equipments UEs to transmit a sounding signal; and a transmitting module, configured to transmit the sounding signal to the base station according to the instruction information.

In another respect, embodiments of the present invention provide a base station, including:

a triggering module, configured to transmit a trigger message to at least one UE in a group of user equipments UEs, where the trigger message includes instruction information, and the instruction information is used for instructing the at least one UE to transmit a sounding signal; and a receiving module, configured to receive the sounding signal transmitted by the at least one UE according to the instruction information.

Embodiments of the present invention provide a method for transmitting a sounding signal, a base station and a user equipment. According to the method for transmitting the sounding signal, the base station and the user equipment provided by embodiments of the present invention, an eNodeB may trigger at least one UE in a group of UEs to transmit a sounding signal according to a certain rule on a PDCCH, thereby improving efficiency.

BRIEF DESCRIPTION OF DRAWINGS

To describe technical solutions in embodiments of the present invention more clearly, the following briefly describes the accompanying drawings required in the description of embodiments; apparently, the accompanying drawings illustrate only some exemplary embodiments of the present invention, and those skilled in the art can derive other drawings from these drawings without creative efforts.

DESCRIPTION OF EMBODIMENTS

The technical solutions in embodiments of the present invention are described clearly and comprehensively with reference to the accompanying drawings; apparently, the embodiments described are only some exemplary embodiments of the present invention, rather than all embodiments. Other embodiments derived by those skilled in the art on the basis of embodiments of the present invention without any creative effort fall within the protection scope of the present invention.

Figure 1:
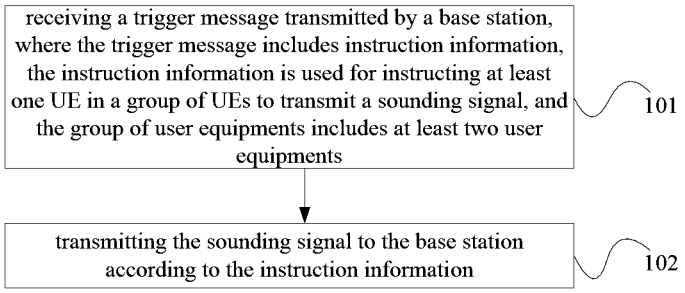
FIG. 1 is a flow diagram of a first embodiment of a method for transmitting a sounding signal according to the present invention.

FIG. 1 is a flow diagram of a first embodiment of a method for transmitting a sounding signal according to the present invention. As shown in FIG. 1, the method according to this embodiment may include:

Step 101, receiving a trigger message transmitted by a base station, where the trigger message includes instruction information, the instruction information is used for instructing at least one UE in a group of UEs to transmit a sounding signal, and the group of user equipments includes at least two user equipments; and Step 102, transmitting the sounding signal to the base station according to the instruction information.

In particular, in this embodiment, the base station, such as an eNodeB, transmits a trigger message to a group of UEs, where the trigger message may include instruction information, and the function of the instruction information is to instruct one or a plurality of UEs in the group of UEs to transmit a sounding signal, that is, at one time, one or a plurality of UEs in the group of UEs is(are) triggered to transmit a sounding signal.

As for the UE, the UE may receive the trigger message transmitted by the base station, where the trigger message may include the instruction information. Therefore, the triggered UE may transmit a sounding signal to the base station according to the instruction information.

It should be noted that, a person having ordinary skill in the art may, discretionarily group to-be-triggered UEs under the base station according to the requirements. This embodiment has no limitation on details of how to group.

In addition, this embodiment also has no limitation on what kind of sounding signal resource configuration the at least one UE specifically adopts, or on how a sounding signal is transmitted by the at least one UE, for example, a preset sounding signal resource is occupied by adopting a preset rule.

According to the embodiment, a UE may receive a trigger message transmitted by a base station, where the trigger message may trigger at least one UE in a group of UEs which includes the UE through instruction information carried in the trigger message, so that the at least one UE in the group of UEs receiving the trigger message may transmit a sounding signal according to the instruction information, thereby improving the efficiency.

In the aforementioned embodiment, the trigger message in step 101 may be realized by adopting two modes, where one mode is to adopt a high layer signaling, where the high layer signaling includes the instruction information; the other mode is to adopt a PDCCH bearing DCI, where the DCI includes the instruction information. In embodiments of the present invention, the DCI is DCI for scheduling a group of UEs, and is also named as a group DCI. A cyclic redundancy check (abbreviated as CRC) of the group DCI for scheduling the group of UEs is scrambled by adopting a group radio network temporary identifiers (abbreviated as RNTI).

It should be noted that, the high layer signaling in this embodiment includes: a media access control-control element (abbreviated as MAC CE), a radio resource control (abbreviated as RRC) message, etc. Where, the MAC CE may be a newly introduced MAC CE, and may also be a reused existing MAC CE, such as a discontinuous receiver command (abbreviated to DRX command) and an activation/deactivation signaling; the RRC message may be a newly introduced RRC message, and may also be a reused existing RRC message, such as an RRC reconfiguration message having an added new information element (abbreviated as IE).

In the following, instruction modes of the instruction information are further illustrate by taking examples:

Mode 1:

0: do not trigger the group of UEs to transmit a sounding signal;

1: trigger the group of UEs to transmit a sounding signal according to a certain rule. The rule of transmitting the sounding signal by the UE may be preset, and the UE may pre-acquire the rule, or an eNodeB notifies the UE of the specifically adopted rule through a high layer signaling, for example, the eNodeB notifies the UE in a system broadcast or by using a cell added in a sounding signal configuration message.

Mode 2:

00: do not trigger the group of UEs to transmit a sounding signal;

01: trigger the group of UEs to transmit a sounding signal according to rule a;

10: trigger the group of UEs to transmit a sounding signal according to rule b;

11: trigger the group of UEs to transmit a sounding signal according to rule c.

Where, the rule a, the rule b and the rule c are any rule of transmitting a sounding signal by a group of UEs. The rules may be preset, and the UE may pre-acquire each rule.

It should be noted that, the above mode 2 may also be expanded to occupy more than 2 bits so as to represent more selections of sounding signal rules.

Figure 2:
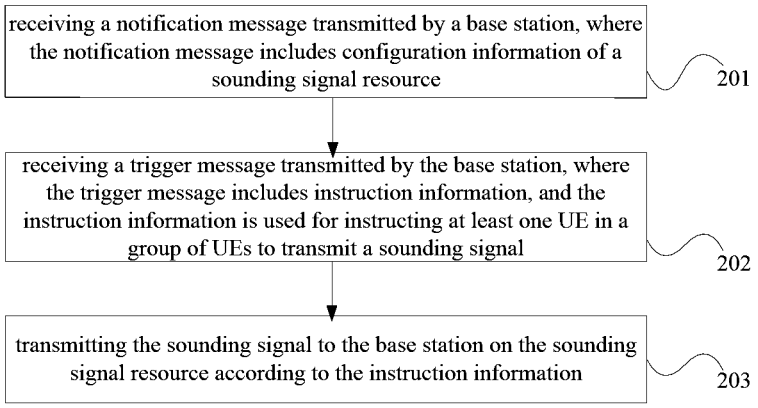
FIG. 2 is a flow diagram of a second embodiment of a method for transmitting a sounding signal according to the present invention.

FIG. 2 is a flow diagram of a second embodiment of a method for transmitting a sounding signal according to the present invention. As shown in FIG. 2, the method of this embodiment may include:

Step 201, receiving a notification message transmitted by a base station, where the notification message includes configuration information of a sounding signal resource;

Step 202, receiving a trigger message transmitted by the base station, where the trigger message includes instruction information, and the instruction information is used for instructing at least one UE in a group of UEs to transmit a sounding signal;

Step 203, transmitting the sounding signal to the base station on the sounding signal resource according to the instruction information.

In this embodiment, a group of UEs includes at least two UEs, a base station may transmit a trigger message to a group of UEs, where the trigger message may include instruction information, and the function of the instruction information is to instruct one or a plurality of UEs in the group of UEs transmit the sounding signal, that is, at one time, one or a plurality of UEs in the group of UEs is(are) triggered to transmit a sounding signal. Differing from the first embodiment, the base station transmit a notification message to the at least one UE in the group of UEs before transmitting the trigger message to the UE, where the notification message includes configuration information of the sounding signal resource. Herein, the notification message may be transmitted as a single message, or transmitted through a piece of information, where the piece of information includes configuration information of the sounding signal resources of some certain UEs or all the UEs need to be notified. Then, the UE transmits the sounding signal to the base station on the sounding signal resource according to the instruction information. Optionally, the step of transmitting the notification message to the UE by the base station in this embodiment may also be performed after the base station transmits the trigger message to the UE, or the base station may also simultaneously transmit the notification message and the trigger message to the UE. In the process there are two modes of transmitting the notification message, one mode is that the notification message is carried by a high layer signaling, where the high layer signaling includes the configuration information; the other mode is that the notification message is carried by a PDCCH bearing DCI, where the DCI includes the configuration information.

In step 203, the sounding signal is transmitted to the base station on the sounding signal resource according to the instruction information, where the modes of transmitting the sounding signal include three modes as follows, and this embodiment is not limited to these three modes:

Mode 1 is that the UE transmit the sounding signal to the base station by adopting a mode of occupying a sounding signal resource in a time division manner. Under the situation:

when the configuration information further includes a transmitting sequence of the at least one UE occupying the sounding signal resource in the time division manner, transmit the sounding signal to the base station by adopting the transmitting mode of a sounding signal resource occupied in a time division manner, which includes: according to the transmitting sequence, occupying a sounding signal resource in a time division manner, and transmitting the sounding signal to the base station;

when receiving a high layer signaling transmitted by the base station, where the high layer signaling includes a transmitting sequence of the at least one UE occupying the sounding signal resource in the time division manner, transmit the sounding signal to the base station by adopting the transmitting mode of occupying a sounding signal resource in a time division manner, which includes: according to the transmitting sequence, occupying a sounding signal resource in a time division manner, and transmitting the sounding signal to the base station.

Mode 2 is that the UE transmits a sounding signal to the base station on a sounding signal resource, including: determining an available resource corresponding to the UE itself in the sounding signal resource, and transmitting the sounding signal to the base station on the available resource.

Mode 3 is that when the configuration information includes a sounding signal resource corresponding to each UE in the at least one UE, the UE transmit a sounding signal to the base station on the sounding signal resource, in particular the UE may adopt: transmitting the sounding signal to the base station on the sounding signal resource corresponding to the UE itself.

In the following, transmitting modes of the sounding signal are further illustrate by taking examples:

1. only trigger one UE in the group of UEs to transmit a sounding signal.

Before triggering the UE to transmit a sounding signal, an eNodeB transmits sounding signal configuration information to the group of UEs through a high layer signaling, for example, a frequency domain position $n_{RRC}$, a transmission comb $k_{TC}$ and a cyclic shift $n_{SRS}^{CS}$, a SRS bandwidth $B_{SRS}$, etc. The sounding signal configuration information may include a subframe position where the UE transmits the sounding signal, and the sounding signal configuration information may also not include the subframe position where the UE transmits the sounding signal and a system preset mode is adopted, for example, a first subframe in the next radio frame is specified.

Once triggered, the selected UE transmits the sounding signal according to the sounding signal configuration information. There may be multiple modes of selecting a UE transmitting a sounding signal, for example, invariably selecting one, or randomly selecting one. Details are provided hereinafter.

For example, a UE for transmitting a sounding signal is invariably selected, for example, a UE with a serial number 0 in the group is invariably selected for transmitting a sounding signal. Or, the serial number of the UE being required to transmit a sounding signal is notified through a high layer signaling, or is preset in the system, or is instructed in the group DCI.

Alternatively, a UE for transmitting a sounding signal is randomly selected, assuming that there are M UEs in a group, the UE with an intra-group serial number mmod M is specified for transmitting the sounding signal. Where, "mod" is a modulus operation, and m is a radio frame number. The UE's action, after the sounding signal is triggered, may be transmitting the sounding signal in only one subframe, and may also be performing frequency hopping on several subframes, and transmitting the proble signal throughout the whole bandwidth, where the mode of frequency hopping may reuse the prior art.

Or, the eNB notifies which UE in the group is to transmit the sounding signal, for example, the eNB adopts "000" to instruct a UE with a serial number 0 in a group of UEs to transmit the sounding signal, where the instruction information may be placed in the notification message, and may also be notified to the UE by adopting a single message.

2. Trigger more than two UEs in the group of UEs to transmit a sounding signal, where the group of UEs occupy the same sounding signal resource configured by a high layer in a time division manner in accordance with a certain sequence (for example, an intra-group position).

Before triggering the UE to transmit a sounding signal, an eNodeB transmits sounding signal configuration information to the group of UEs through a high layer signaling, for example, a frequency domain position $n_{RRC}$, a transmission comb $k_{TC}$ and a cyclic shift $n_{SRS}^{CS}$, a SRS bandwidth $B_{SRS}$, etc. The sounding signal configuration information may include a subframe position where the UE transmits the sounding signal, and the sounding signal configuration information may also not include the subframe position where the UE transmits the sounding signal and a system preset mode is adopted, for example, a first subframe in the next radio frame is specified.

Once triggered, the triggered UEs in the group occupy the sounding signal resource in a time division manner according to a certain sequence to transmit a sounding signal. The sequence of transmitting the sounding signals by the UEs may be predefined or notified through a high layer signaling. For example, according to an intra-number sequence either in an increasing order or a decreasing order, the triggered UEs occupy the sounding signal resource in sequence on a subframe that is allowable for transmitting a sounding signal in the cell, so as to transmit the sounding signal, for example, subframes that are allowable for transmitting a sounding signal in the cell are {0,1,2,3,4,5,6,8}. Assuming that there are 8 triggered UEs in the group of UEs, then UE#0~UE#6 transmit a sounding signal on these subframes, respectively, and UE#7 transmits a sounding signal on a 0 subframe of the next radio frame. It may also be notified through the high layer signaling notification or preset, so that the UEs in the group transmits the sounding signals on certain subframes that are allowable for transmitting a sounding signal in the cell, for example, each of the triggered UEs transmits the sounding signal on subframe #0 in sequence according to an intra-number sequence either in increasing order or decreasing order.

Which UEs in the group shall be triggered to transmit the sounding signal may be preset, for example, it is preset that UEs with odd numbers/even numbers shall be triggered to transmit or it is preset that all UEs shall be triggered to transmit; which UEs in the group shall be triggered to transmit the sounding signal may also be notified by an eNodeB to the UEs, for example, a notification message/a single message transmitted by the eNodeB to the UEs includes 1 bit instruction information, where "0" represents triggering UEs with odd numbers to transmit the sounding signal, "1" represents triggering UEs with even numbers to transmit the sounding signal, or, a notification message/a single message includes a bitmap, for example, one group has 8 UEs, and a bitmap "00110010" represents triggering UEs with numbers 2, 3 and 6 to transmit the sounding signal.

The UE's action, after the sounding signal is triggered, may be transmitting the sounding signal in only one subframe, and may also be performing frequency hopping on several subframes, and transmitting the proble signal throughout the whole bandwidth. The mode of frequency hopping may reuse the prior art. A slight difference is, because all UEs transmit the sounding signal in a time division manner, one mode is that all UEs are bound altogether to perform frequency hopping, or another mode is that, after one UE performs frequency hopping and traverses the full SRS bandwidth, the next UE gets its turn to perform frequency hopping. Embodiments of the present invention are not confined to the two modes of frequency hopping.

3. Trigger more than two UEs in the group of UEs to transmit a sounding signal, and the group of UEs transmit the sounding signal according to the sounding signal configuration information notified by the high layer signaling.

Before triggering the UE to transmit a sounding signal, an eNodeB transmits sounding signal configuration information to the group of UEs through a high layer signaling, for example, a frequency domain position $n_{RRC}$, a transmission comb $k_{TC}$ and a cyclic shift $n_{SRS}^{CS}$, a SRS bandwidth $B_{SRS}$, etc. The sounding signal configuration information may include a subframe position where the UE transmits the sounding signal, and the sounding signal configuration information may also not include the subframe position where the UE transmits the sounding signal and a system preset mode is adopted.

The sounding signal configuration information notified by the eNodeB may be one piece of sounding signal configuration information, based on which the sounding signal configuration information of all UEs in the group is obtained through extrapolation or, the eNodeB may notify the sounding signal configuration of all UEs. Details are provided hereinafter.

One situation is when the eNodeB configures a sounding signal resource for the group of UEs by transmitting a high layer signaling, i.e., a set of sounding signal configuration information, for example, a frequency domain position $n_{RRC}$, a transmission comb $k_{TC}$ and a cyclic shift $n_{SRS}^{CS}$, a SRS bandwidth $B_{SRS}$, etc.

Once the UEs in the group of UEs are triggered to transmit the sounding signal, each triggered UE in the group may calculate its own frequency domain position, transmission comb and cyclic shift according to the intra-group position or the intra-number thereof. Provided that the intra-group number of a UE is UE-Num, then: the frequency domain starting position of the sounding signal of each triggered UE in the group is:

$$(n_{RRC}+\text{floor}(\text{UE-NUM}/16)\times C_{SRS})\bmod N_{RB},$$

where, floor represents a round-down, $N_{RB}$ is a system bandwidth, which is represented by the number of the RB.

The cyclic shift is: $(\text{UE-Num} \bmod 2+n_{SRS}^{CS}) \bmod 8$

The transmission comb is: $k_{TC}$ if the UE-Num is an even number, or $(k_{TC}+1) \bmod 2$ if the UE-Num is an odd number.

As aforementioned, the sounding signal configuration information may include the subframe position where the UE transmits the sounding signal, and the sounding signal configuration information may also not include the subframe position where the UE transmits the sounding signal and a system preset mode is adopted. For example, the sounding signal configuration information includes the subframe information of transmitting the sounding signal simultaneously by the triggered UEs, once triggered, all the triggered UEs in the group simultaneously transmit the sounding signals on the subframe; or the sounding signal configuration information includes the subframe information of transmitting the sounding signal by each UE, once triggered, all the triggered UEs in the group transmit sounding signals on subframe positions corresponding to the UEs theirselves. The sounding signal configuration information may also not include the subframe position information, and a system preset mode is adopted, for example, a first subframe in the next radio frame is preset, once triggered, all the triggered UEs in the group will simultaneously transmit sounding signals on the first subframe in the next radio frame; or, each UE is preset with a subframe position, once triggered, all the triggered UEs in the group will transmit sounding signals on the preset subframe positions.

Another situation is when an eNodeB notifies each UE in the group of a sounding signal resource respectively, i.e., multiple sets of sounding signal configuration information, by transmitting a high layer signaling. For example, each UE is configured with a frequency domain position $n_{RRC}$, a transmission comb $k_{TC}$ and a cyclic shift $n_{SRS}^{CS}$, a SRS bandwidth $B_{SRS}$, etc. Similar to the first situation, the sounding signal configuration information may include a subframe position where the UE transmits a sounding signal, and the sounding signal configuration information may also not include the subframe position where the UE transmits the sounding signal and a system preset mode is adopted. Similar to the first situation, after more than two UEs in the group are triggered to transmit sounding signals, the triggered UEs in the group transmits sounding signals on the subframe positions and the sounding signal resources corresponding to the UEs theirselves.

Which UEs in the group shall be triggered to transmit the sounding signal may be preset, for example, it is preset that UEs with odd numbers/even numbers shall be triggered to transmit or it is preset that all UEs shall be triggered to transmit; which UEs in the group shall be triggered to transmit the sounding signal may also be notified by an eNodeB to the UEs, for example, a notification message/a single message transmitted by the eNodeB to the UEs includes 1 bit instruction information, where "0" represents triggering UEs with odd numbers to transmit the sounding signal, "1" represents triggering UEs with even numbers to transmit the sounding signal, or, a notification message/a single message includes a bitmap, for example, one group has 8 UEs, and a bitmap "00110010" represents triggering UEs with numbers 2, 3 and 6 to transmit the sounding signal.

The action of each triggered UE in the group, after the sounding signal is triggered, may be transmitting the sounding signal in only one subframe, and may also be performing frequency hopping on several subframes, and transmitting the proble signal throughout the whole bandwidth. The mode of frequency hopping may reuse the prior art. A slight difference is, because all UEs transmit the sounding signal in a time division manner, one mode is that all UEs are bound altogether to perform frequency hopping, or another mode is that, after one UE performs frequency hopping and traverses the full SRS bandwidth, the next UE gets its turn to perform frequency hopping. Embodiments of the present invention are not confined to the two modes of frequency hopping.

It should be noted that, the sounding signal configuration information notified by the eNodeB to the UEs may be merely an index of the sounding signal resource configuration, for example, eight sounding signal resource configurations are provided for UEs, where the configuration information may be preset or included in a broadcast message, then a 3-bit index may be adopted to represent one of the eight sounding signal resource configurations. When the eNodeB notifies the UE of its configuration information, only 3-bit is needed for representing. For example, the eNodeB notifies a group of UEs "000", the group of UEs may obtain a sounding signal resource according to the information, and then one/several/all of the group of UEs occupy this sounding signal resource in a time division manner for transmitting sounding signals, or, assuming that this resource corresponds to the sounding signal resource of a UE with number 0, sounding signal resources of other UEs can calculate sounding signal resources corresponding to theirselves according to the formulas in the first situation of the above illustrated third sounding signal transmission mode. Of course, the eNodeB may also notify each of some UEs/all the UEs in the group of an index of a sounding signal resource configuration, respectively.

Figure 3:
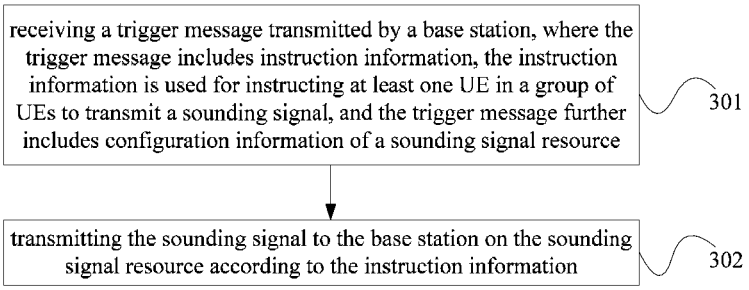
FIG. 3 is a flow diagram of a third embodiment of a method for transmitting a sounding signal according to the present invention.

FIG. 3 is a flow diagram of a third embodiment of a method for transmitting a sounding signal according to the present invention. As shown in FIG. 3, the method according to the embodiment may include:

Step 301, receiving a trigger message transmitted by a base station, where the trigger message includes instruction information, the instruction information is used for instructing at least one UE in a group of UEs to transmit a sounding signal, and the trigger message further includes configuration information of a sounding signal resource;

Step 302, transmitting the sounding signal to the base station on the sounding signal resource according to the instruction information.

The embodiment differs from the aforementioned second embodiment in that the trigger message further includes the configuration information of the sounding signal resource, so that there is no need for the base station to transmit a notification message to the UE, the configuration information of the sounding signal resource is included in the trigger message and, thus, after receiving the trigger message, the UE may directly transmit the sounding signal to the base station on the sounding signal resource according to the instruction information.

In step 302, the sounding signal is transmitted to the base station on the sounding signal resource according to the instruction information, where the modes of transmitting the sounding signal also include three types as the same as that in the second embodiment, for details please refer to the second embodiment, and will not be repeated herein.

Figure 4:
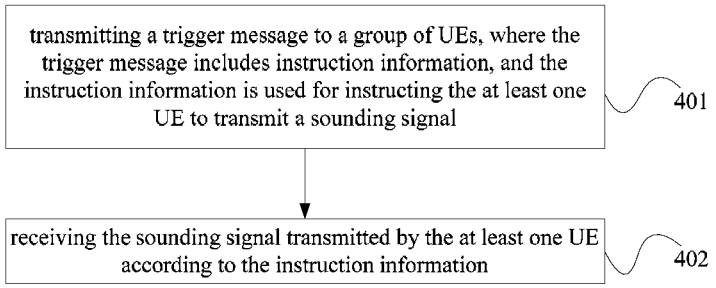
FIG. 4 is a flow diagram of a forth embodiment of a method for receiving a sounding signal according to the present invention.

FIG. 4 is a flow diagram of a forth embodiment of a method for receiving a sounding signal according to the present invention. As shown in FIG. 4, the method of the embodiment may include:

Step 401, transmitting a trigger message to a group of UEs, where the trigger message includes instruction information, and the instruction information is used for instructing the at least one UE to transmit a sounding signal;

Step 402, receiving the sounding signal transmitted by the at least one UE according to the instruction information.

In this embodiment, in step 401, a base station transmits a trigger message to a group of UEs, where the trigger message may include instruction information, and the function of the instruction information is to instruct one or a plurality of UEs in the group of UEs to transmit a sounding signal, that is, at one time, one or a plurality of UEs in the group of UEs is(are) triggered to transmit a sounding signal.

As for the UE, the UE may receive the trigger message transmitted by the base station, where the trigger message may include instruction information, for example, the instruction information may be the aforementioned instruction information. Therefore, the triggered UE may transmit a sounding signal to the base station according to the instruction information.

According to the embodiment, a base station may transmit a trigger message to a group of UEs, and correspondingly, a UE may receive a trigger message transmitted by the base station, where the trigger message may trigger the group of UEs through instruction information carried in the trigger message, so that the at least one UE in the group of UEs receiving the trigger message may transmit a sounding signal according to the instruction information, thereby improving the efficiency.

In the aforementioned embodiment, the trigger message in step 401 may be realized by adopting two modes, where one first mode is to adopt a high layer signaling, where the high layer signaling includes the instruction information; the other mode is to adopt a physical downlink control channel (PDCCH) bearing downlink control information (DCI), where the DCI includes the instruction information. It should be noted that, the high layer signaling according to this embodiment is as the same as that in the above embodiments, and is not described herein. The instruction modes of the instruction information herein are as follows:

Mode 1:

0: do not trigger the group of UEs to transmit a sounding signal;

1: trigger the group of UEs to transmit a sounding signal according to a certain rule. The rule of transmitting the sounding signal by the UE may be preset, and the UE may pre-acquire the rule, or an eNodeB notifies the UE of the specifically adopted rule through a high layer signaling, for example, the eNodeB notifies the UE in a system broadcast or by using a cell added in a sounding signal configuration message.

Mode 2:

00: do not trigger the group of UEs to transmit a sounding signal;

01: trigger the group of UEs to transmit a sounding signal according to rule a;

10: trigger the group of UEs to transmit a sounding signal according to rule b;

11: trigger the group of UEs to transmit a sounding signal according to rule c.

Where, the rule a, the rule b and the rule c are any rule of transmitting a sounding signal by a group of UEs. The rules may be preset, and the UE may pre-acquire each rule.

It should be noted that, the above mode 2 may also be expanded to occupy more than 2 bits so as to represent more selections of sounding signal rules.

Figure 5:
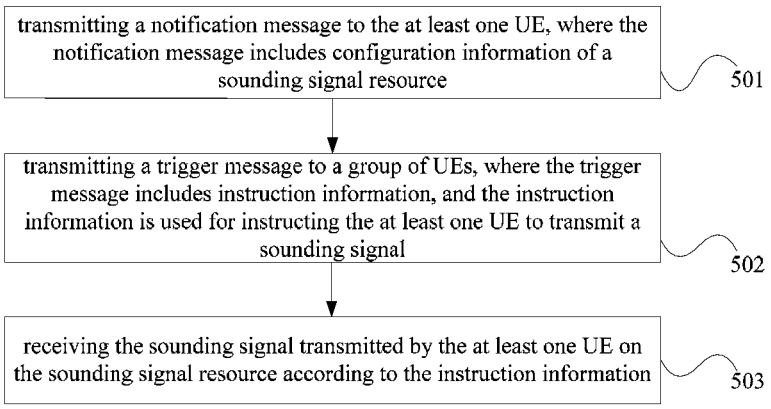
FIG. 5 is a flow diagram of a fifth embodiment of a method for receiving a sounding signal according to the present invention.

FIG. 5 is a flow diagram of a fifth embodiment of a method for receiving a sounding signal according to the present invention. As shown in FIG. 5, the method according to the embodiment further includes:

Step 501, transmitting a notification message to the at least one UE, where the notification message includes configuration information of a sounding signal resource;

Step 502, transmitting a trigger message to a group of UEs, where the trigger message includes instruction information, and the instruction information is used for instructing the at least one UE to transmit a sounding signal;

Step 503, receiving the sounding signal transmitted by the at least one UE on the sounding signal resource according to the instruction information.

In this embodiment, a group of UEs includes at least two UEs, a base station may transmit a trigger message to a group of UEs, where the trigger message may include instruction information, and the function of the instruction information is to instruct one or a plurality of UEs in the group of UEs transmit the sounding signal, that is, at one time, one or a plurality of UEs in the group of UEs is(are) triggered to transmit a sounding signal. Differing from the fourth embodiment, the base station transmit a notification message to the at least one UE in the group of UEs before transmitting the trigger message to the UE, where the notification message includes configuration information of the sounding signal resource. Herein, the notification message may be transmitted as a single message, or transmitted through a piece of information, where the piece of information includes configuration information of the sounding signal resources of some certain UEs or all the UEs need to be notified. Then, the UE transmits the sounding signal to the base station on the sounding signal resource according to the instruction information. Correspondingly, the base station receives the sounding signal transmitted by the at least one UE on the sounding signal resource according to the instruction information. Optionally, the step of transmitting the notification message to the UE by the base station in this embodiment may also be performed after the base station transmits the trigger message to the UE, or the base station may also simultaneously transmit the notification message and the trigger message to the UE.

In the process there are two modes of transmitting the notification message, one mode is that the notification message is carried by a high layer signaling, where the high layer signaling includes the configuration information; the other mode is that the notification message is carried by a PDCCH bearing DCI, where the DCI includes the configuration information.

In step 503, the receiving, by the base station, the sounding signal transmitted by at least one UE on the sounding signal resource according to the instruction information, includes three situations hereinafter, and this embodiment is not limited to these three modes:

1. Receiving the sounding signal transmitted by at least one UE by adopting a mode of occupying a sounding signal resource in a time division manner. Under the situation:

when the configuration information further includes a transmitting sequence of the at least one UE occupying the sounding signal resource in the time division manner, the UE transmit the sounding signal to the base station by adopting the transmitting mode of a sounding signal resource occupied in a time division manner, which includes: according to the transmitting sequence, occupying a sounding signal resource in a time division manner, and transmitting the sounding signal to the base station, correspondingly, the base station received the sounding signal transmitted by the UE.

When the high layer signaling transmitted by the base station includes a transmitting sequence of the at least one UE occupying the sounding signal resource in the time division manner, the UE transmits the sounding signal to the base station by adopting the transmitting mode of occupying a sounding signal resource in a time division manner, which includes: according to the transmitting sequence, occupying a sounding signal resource in a time division manner, and transmitting the sounding signal to the base station, correspondingly, the base station receives the sounding signal transmitted by the UE.

2. The UE determines an available resource corresponding to the UE itself in the sounding signal resource, and transmits the sounding signal to the base station on the available resource. Correspondingly, the base station receives the sounding signal transmitted by the UE.

3. When the configuration information includes the sounding signal resource corresponding to each UE in the at least one UE, the UE transmits the sounding signal to the base station on the sounding signal resource, which includes: transmitting the sounding signal to the base station on the sounding signal resource corresponding to the UE itself, and, correspondingly, the base station receives the sounding signal transmitted by the UE.

Figure 6:
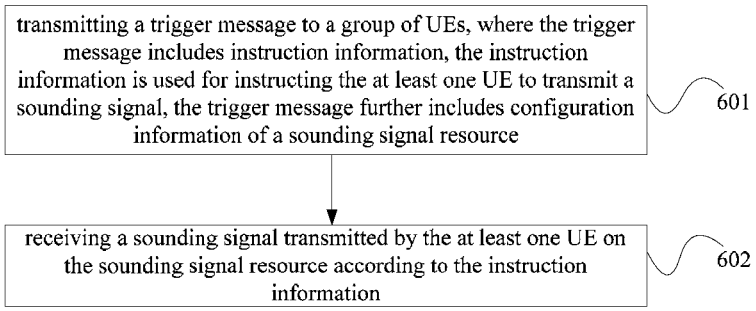
FIG. 6 is a flow diagram of a sixth embodiment of a method for receiving a sounding signal according to the present invention.

FIG. 6 is a flow diagram of a sixth embodiment of a method for receiving a sounding signal according to the present invention. As shown in FIG. 6, the method according to the embodiment further includes:

Step 601, transmitting a trigger message to a group of UEs, where the trigger message includes instruction information, the instruction information is used for instructing the at least one UE to transmit a sounding signal, the trigger message further includes configuration information of a sounding signal resource;

Step 602, receiving a sounding signal transmitted by the at least one UE on the sounding signal resource according to the instruction information.

The embodiment differs from the aforementioned fifth embodiment in that the trigger message further includes the configuration information of the sounding signal resource, so that there is no need for the base station to transmit a notification message to the UE, the configuration information of the sounding signal resource is included in the trigger message and, thus, after receiving the trigger message, the UE may directly transmit the sounding signal to the base station on the sounding signal resource according to the instruction information, correspondingly, the base station receives the sounding signal.

In step 602, the sounding signal is transmitted by the at least one UE on the sounding signal resource according to instruction information, where the modes of receiving by the base station the transmitted sounding signal also includes three types as the same as that in the fifth embodiment, for details please refer to the fifth embodiment, and will not be repeated herein.

The aforementioned methods is not only used for triggering a group of UEs to transmit a non-periodic sounding signal, but also can be used for triggering a group of UEs to transmit a periodic sounding signal. In triggering a group of UEs to transmit a periodic sounding signal, an eNodeB is required to notify the UE of the transmission period, which can reuse the prior art.

According to the method for receiving a sounding signal provided by the aforementioned embodiments, the eNodeB may trigger at least one UE in a group of UEs to transmit a sounding signal according to a certain rule on a PDCCH, thereby improving efficiency and solving the problem that the PDCCH resource is constrained.

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program codes, such as a ROM, a RAM, a magnetic disk, or an optical disc.

Figure 7:
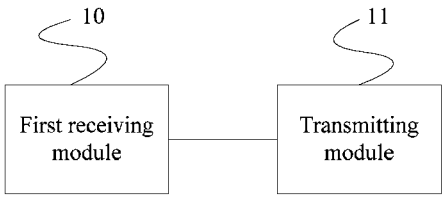
FIG. 7 is a schematic structural diagram of a first embodiment of a user equipment according to the present invention.

FIG. 7 is a schematic structural diagram of a first embodiment of a user equipment according to the present invention. As shown in FIG. 7, the user equipment includes:

a first receiving module 10, configured to receive a trigger message transmitted by a base station, where the trigger message includes instruction information, and the instruction information is used for instructing at least one UE in a group of user equipments (UEs) to transmit a sounding signal; where the trigger message is carried by a high layer signaling, and the high layer signaling includes the instruction information; or the trigger message is carried by a physical downlink control channel (PDCCH) bearing downlink control information (DCI), where the DCI includes the instruction information; and a transmitting module 11, configured to transmit the sounding signal to the base station according to the instruction information.

The embodiment is configured to execute the technical solution of the method embodiment as shown in FIG. 1, where the implement principle and technical effects thereof are similar, and will not be repeated herein.

Figure 8:
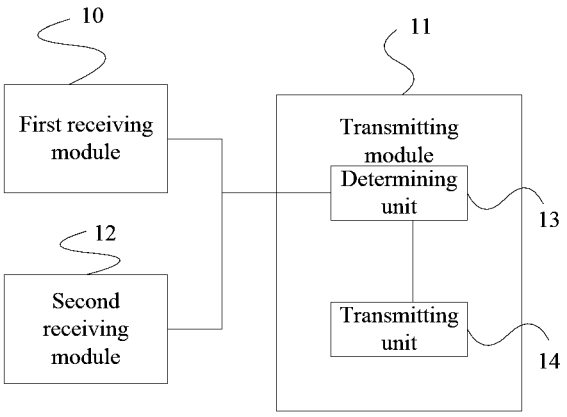
FIG. 8 is a schematic structural diagram of a second embodiment of a user equipment according to the present invention.

FIG. 8 is a schematic structural diagram of a second embodiment of a user equipment according to the present invention. As shown in FIG. 8, on the basis of the structure as shown in FIG. 7, the user equipment according to this embodiment further includes: a second receiving module 12, configured to receive a notification message transmitted by the base station simultaneous with, before, or after the first receiving module receives the trigger message from the base station, where the notification message includes configuration information of a sounding signal resource; where the notification message may adopt a high layer signaling, and the high layer signaling includes the configuration information; or the notification message is carried by a PDCCH bearing DCI, where the DCI includes the configuration information.

The transmitting module 11 is specifically configured to transmit the sounding signal to the base station on the sounding signal resource according to the instruction information. Specifically, the transmitting module 11 may optionally have the following three functions:

1. The transmitting module 11 may be specifically configured to adopt a mode of occupying the sounding signal resource in a time division manner, and transmit the sounding signal to the base station.

Under the situation: when the configuration information further includes a transmitting sequence of the at least one UE occupying the sounding signal resource in the time division manner, the transmitting module 11 is specifically configured to, according to the transmitting sequence, occupy the sounding signal resource in a time division manner and transmit the sounding signal to the base station.

The second receiving module 12 is further configured to receive a high layer signaling transmitted by the base station, where the high layer signaling includes the transmitting sequence of the at least one UE occupying the sounding signal resource in the time division manner; the transmission module 11 is specifically configured to, according to the transmission sequence, occupy the sounding signal resource in the time division manner and transmit the sounding signal to the base station.

2. If the configuration information includes a sounding signal resource corresponding to each UE in the at least one UE, the transmission module 11 is specifically configured to transmit the sounding signal to the base station on a sounding signal resource corresponding to the UE itself.

3. The transmission module 11 may include:

a determining unit 13, configured to determine an available resource corresponding to the UE itself in the sounding signal resource; and a transmission unit 14, configured to transmit the sounding signal to the base station on the available resource.

The embodiment is configured to execute the technical solution of the method embodiment as shown in FIG. 2, where the implement principle and technical effects thereof are similar, and will not be repeated herein.

Figure 9:
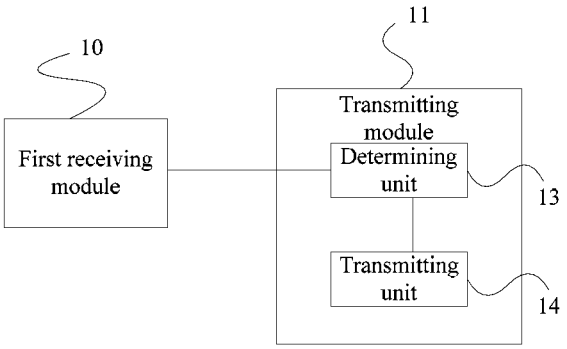
FIG. 9 is a schematic structural diagram of a third embodiment of a user equipment according to the present invention.

FIG. 9 is a schematic structural diagram of a third embodiment of a user equipment according to the present invention. As shown in FIG. 9, on the basis of the structure as shown in FIG. 7, the user equipment according to the embodiment further includes: a first receiving module 10, configured to receive a trigger message transmitted by a base station, where the trigger message includes instruction information, and the instruction information is used for instructing at least one UE in a group of user equipments (UEs) to transmit a sounding signal, the trigger message further includes configuration information of a sounding signal resource; where the trigger message is carried by a high layer signaling, the high layer signaling includes instruction information; or the trigger message is carried by a physical downlink control channel (PDCCH) bearing downlink control information (DCI), where the DCI includes the instruction information.

The transmitting module 11 is specifically configured to transmit the sounding signal to the base station on the sounding signal resource according to the instruction information. Specifically, the transmitting module 11 may specifically have the following three functions:

1. The transmitting module 11 may be specifically configured to adopt a mode of occupying the sounding signal resource in a time division manner, and transmit the sounding signal to the base station.

Under the situation: when the configuration information further includes a transmitting sequence of the at least one UE occupying the sounding signal resource in the time division manner, the transmission module 11 is specifically configured to, according to the transmitting sequence, occupy the sounding signal resource in a time division manner and transmit the sounding signal to the base station.

2. If the configuration information includes a sounding signal resource corresponding to each UE in the at least one UE, the transmission module 11 is specifically configured to transmit the sounding signal to the base station on a sounding signal resource corresponding to the UE itself.

3. The transmission module 11 may include:

a determining unit 15, configured to determine an available resource corresponding to the UE itself in the sounding signal resource; and a transmission unit 16, configured to transmit the sounding signal to the base station on the available resource.

The embodiment is configured to execute the technical solution of the method embodiment as shown in FIG. 3, where the implement principle and technical effects thereof are similar, and will not be repeated herein.

Figure 10:
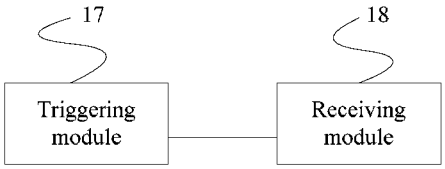
FIG. 10 is a schematic structural diagram of a first embodiment of a base station according to the present invention.

FIG. 10 is a schematic structural diagram of a first embodiment of a base station according to the present invention. As shown in FIG. 10, the base station includes:

a triggering module 17, configured to transmit a trigger message to a group of user equipments (UEs), where the trigger message includes instruction information, and the instruction information is used for instructing the at least one UE to transmit a sounding signal; where the trigger message is carried by a high layer signaling, and the high layer signaling includes the instruction information; or the trigger message is carried by a physical downlink control channel (PDCCH) bearing downlink control information (DCI), where the DCI includes the instruction information; and a receiving module 18 configured to receive the sounding signal transmitted by the at least one UE according to the instruction information.

The embodiment is configured to execute the technical solution of the method embodiment as shown in FIG. 4, where the implement principle and technical effects thereof are similar, and will not be repeated herein.

Figure 11:
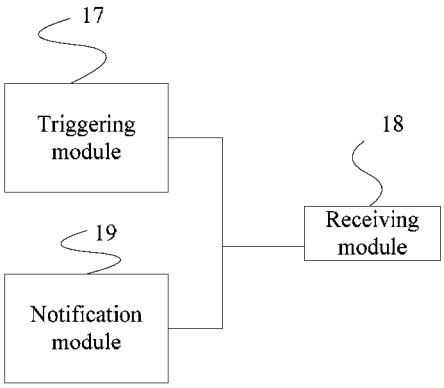
FIG. 11 is a schematic structural diagram of a second embodiment of a base station according to the present invention.

FIG. 11 is a schematic structural diagram of a second embodiment of a base station according to the present invention. As shown in FIG. 11, on the basis of the structure as shown in FIG. 10, the user equipment according to the embodiment further includes:

a notification module 19, configured to transmit a notification message to the at least one UE, where the notification message includes configuration information of a sounding signal resource; where the notification message may adopt a high layer signaling, and the high layer signaling includes the configuration information; or the notification message is carried by a PDCCH bearing DCI, where the DCI includes the configuration information; and the receiving module 18 specifically configured to receive the sounding signal transmitted by the at least one UE on the sounding signal resource according to the instruction information.

According to the embodiment, in particular, the receiving module 18 of the base station may specifically have two functions as follows:

1. The receiving module 18 may specifically be further configured to receive a sounding signal transmitted by the at least one UE by adopting a mode of occupying a sounding signal resource in a time division manner.

Under the situation: when the configuration information further includes a transmitting sequence of the at least one UE occupying the sounding signal resource in the time division manner, the receiving module 18 is specifically configured to receive a sounding signal transmitted by the at least one UE by adopting the mode of occupying the sounding signal resource in the time division manner and according to the transmitting sequence.

Correspondingly, the notification module 19 is further configured to transmit a high layer signaling to the at least one UE, where the high layer signaling includes a transmitting sequence of the at least one UE occupying the sounding signal resource in the time division manner.

2. If the configuration information includes a sounding signal resource corresponding to each UE in the at least one UE, the receiving module 18 is specifically configured to receive a sounding signal transmitted to the base station by the at least one UE on a sounding signal resource corresponding to the UE itself.

The embodiment is configured to execute the technical solution of the method embodiment as shown in FIG. 5, where the implement principle and technical effects thereof are similar, and will not be repeated herein A third embodiment of a base station according to the present invention may adopt the base station structure as shown in FIG. 10, in the base station of the embodiment:

a triggering module 17 is configured to transmit a trigger message to a group of user equipments (UEs), where the trigger message includes instruction information, and the instruction information is used for instructing at least one UE to transmit a sounding signal; the trigger message further includes configuration information of a sounding signal resource; where the trigger message is carried by a high layer signaling, the high layer signaling includes instruction information; or the trigger message is carried by a physical downlink control channel (PDCCH) bearing downlink control information (DCI), where the DCI includes the instruction information.

A receiving module 18 is specifically configured to receive a sounding signal transmitted by the at least one UE on the sounding signal resource according to the instruction information.

According to the embodiment, in particular, the receiving module 18 of the base station may specifically have two functions as follows:

1. The receiving module 18 may specifically be further configured to receive a sounding signal transmitted by the at least one UE by adopting a mode of occupying a sounding signal resource in a time division manner.

Under the situation: when the configuration information further includes a transmitting sequence of the at least one UE occupying the sounding signal resource in the time division manner, the receiving module 18 is specifically configured to receive a sounding signal transmitted by the at least one UE by adopting the mode of occupying the sounding signal resource in the time division manner and according to the transmitting sequence.

2. If the configuration information includes a sounding signal resource corresponding to each UE in the at least one UE, the receiving module 18 is specifically configured to receive a sounding signal transmitted to the base station by the at least one UE on a sounding signal resource corresponding to the UE itself.

The embodiment is configured to execute the technical solution of the method embodiment as shown in FIG. 6, where the implement principle and technical effects thereof are similar, and will not be repeated herein.

The aforementioned embodiments of the present invention are also applicable for a base station to trigger at least one UE in a group of UEs to transmit a channel quality indicator (abbreviated as CQI) or a precoding matrix indicator (abbreviated as PMI) or a rank indicator (abbreviated as RI).

The detailed embodiments of methods and apparatuses for triggering by a base station at least one UE in a group of UEs to transmit CQI/PMI/RI, may be obtained by replacing the sounding signal, in the aforementioned embodiments of the methods for transmitting the sounding signal, the methods for receiving the sounding signal, the base stations and the UEs, into the CQI/PMI/RI.

The difference solely lies in that, the non-periodic CQI/PMI/RI feedback performed by a triggered UE needs to be transmitted by occupying a physical uplink shared channel resource (abbreviated as PUSCH) together with uplink data, i.e., only UEs scheduled by a base station in the group of UEs can perform the non-periodic CQI/PMI/RI feedback on the corresponding PUSCH. Therefore, there is a slight difference between a mode of occupying resources by each UE in the group of UEs when feeding back the CQI/PMI/RI and a mode of occupying resources by each UE in the group of UEs when feeding back the sounding signal. When it is implemented, trigger modes, for example, may adopt:

Mode 1:

0: do not trigger the CQI/PMI/RI feedback;

1: trigger the CQI/PMI/RI feedback.

Where, the CQI/PMI/RI feedback mode specifically adopted by a UE may be preset, or be notified through the system broadcast, or be instructed by using a cell added in the CQI/PMI/RI feedback configuration message.

Mode 2:

00: do not trigger the CQI/PMI/RI feedback;

01: trigger the group of UEs to perform the CQI/PMI/RI feedback according to rule a;

10: trigger the group of UEs to perform the CQI/PMI/RI feedback according to rule b;

11: trigger the group of UEs to perform the CQI/PMI/RI feedback according to rule c;

Where, the rule a, the rule b, and the rule c are any rule of performing the CQI/PMI/RI feedback by a group of UEs, and each rule may be pre-obtained by the UEs.

It should be noted that, the above mode 2 may also be expanded to occupy more than 2 bits so as to represent more selections of CQI/PMI/RI feedback.

There are several rules hereinafter, but embodiments of the present invention are not limited to them:

1. Only trigger scheduled UEs to perform the CQI/PMI/RI feedback; where the scheduled UEs simultaneously transmit CQI/PMI/RI information and uplink data on a PUSCH according to scheduling information. For example, in a group scheduling, only UE#1, UE#4, and UE#5 are scheduled, then only the three UEs are triggered to perform the CQI/PMI/RI feedback.

2. Trigger at least one UE in a group to perform the CQI/PMI/RI feedback, where UEs not being scheduled occupy a reserved resource in a time division manner to perform the feedback; where, the triggered and scheduled UEs may simultaneously transmit CQI/PMI/RI information and uplink data on a PUSCH according to scheduling information, however, the triggered but not being scheduled UEs may feedback the CQI/PMI/RI on a reservation resource. Herein, the mode of notifying the reserved resource is, for example, is similar to triggering the sounding signal, which may be notified through being carried in a trigger message, may be notified through being carried in a notification message, and may also be a preset reserved resource. For the reserved resource, the using mode, for example, may be:

1. The UEs, which are not being scheduled, occupy the same reserved resource in a time division manner according to a certain sequence (e.g. according to an UE number sequence in an increasing order or a decreasing order);

2. The UEs, which are not being scheduled, respectively occupy different reservation resources in a frequency division manner;

3. The UEs, which are not being scheduled, respectively occupy reserved resources with different time-frequency locations.

4. The UEs, which are not being scheduled, perform the transmission on the reservation resources with the same time-frequency resource locations in a code division manner.

It should be noted that, persons skilled in the art may design the reserved resource as needed, which is not defined in embodiments of the present invention.

In summary, embodiments of the present invention can enable an eNodeB to schedule, on a PDCCH, at least one UE in a group of UEs to feed back the CQI/PMI/RI, thereby improving the scheduling efficiency of the CQI/PMI/RI.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof however, these modifications or replacements do not make the essence of corresponding technical solutions depart from the spirit and scope of the technical solutions in the embodiments of the present invention

What is claimed is:

1. A method for transmitting a sounding signal, comprising:

receiving a trigger message transmitted by a base station, wherein the trigger message comprises instruction information for instructing at least one user equipment (UE) in a group of UEs to transmit a sounding signal, and the group of UEs comprises at least two UEs; and transmitting the sounding signal to the base station according to the instruction information;

wherein simultaneous with[, before, or after] the receiving the trigger message transmitted by the base station, the method further comprises: receiving a notification message transmitted by the base station, wherein the notification message comprises configuration information of a sounding signal resource; and *wherein the notification message and the trigger message are carried in one message; and* wherein the transmitting the sounding signal to the base station according to the instruction information comprises: transmitting the sounding signal to the base station on a sounding signal resource corresponding to the UE according to the instruction information, wherein the sounding signal resource corresponding to the UE is calculated by the UE based on the configuration information of the sounding signal resource according to an intra-group position or an intra-number of the UE.

2. The method according to claim 1, wherein:

the trigger message is carried by a high layer signaling that comprises the instruction information; or the trigger message is carried by a physical downlink control channel (PDCCH) bearing downlink control information (DCI), wherein the DCI comprises the instruction information.

3. The method according to claim 1, wherein the transmitting the sounding signal to the base station on the sounding signal resource comprises:

transmitting the sounding signal to the base station by adopting a mode of occupying the sounding signal resource in a time division manner.

4. The method according to claim 3, further comprising:

receiving a high layer signaling transmitted by the base station, wherein the high layer signaling comprises a transmitting sequence of the at least one UE occupying the sounding signal resource in the time division manner;

wherein the transmitting the sounding signal to the base station by adopting the mode of occupying the sounding signal resource in the time division manner comprises occupying the sounding signal resource in the time division manner and transmitting the sounding signal to the base station according to the transmitting sequence.

5. A method for receiving a sounding signal, comprising:

transmitting a trigger message to at least one user equipment (UE) in a group of UEs, wherein the trigger message comprises instruction information for instructing the at least one UE to transmit a sounding signal, and the group of UEs comprises at least two UEs; and receiving the sounding signal transmitted by the at least one UE according to the instruction information;

wherein simultaneous with[, before, or after] the transmitting the trigger message to the at least one UE in the group of UEs, the method further comprises: transmitting a notification message to the at least one UE, wherein the notification message comprises configuration information of a sounding signal resource; and *wherein the notification message and the trigger message are carried in one message; and* wherein the receiving the sounding signal transmitted by the at least one UE according to the instruction information comprises: receiving the sounding signal transmitted by each UE in the group of UEs on a sounding signal resource corresponding to said each UE according to the instruction information, wherein the sounding signal resource corresponding to said each UE is calculated by said each UE based on the configuration information of the sounding signal resource according to an intra-group position or an intra-number of said each UE.

6. The method according to claim 5, wherein the trigger message is carried by a high layer signaling, and the high layer signaling comprises the instruction information; or the trigger message is carried by a physical downlink control channel (PDCCH) bearing downlink control information (DCI), wherein the DCI comprises the instruction information.

7. The method according to claim 5, wherein the receiving the sounding signal transmitted by the at least one UE on the sounding signal resource according to the instruction information comprises: receiving the sounding signal transmitted by the at least one UE by adopting a mode of occupying the sounding signal resource in a time division manner.

8. A user equipment (UE), comprising:

a first receiving module, configured to receive a trigger message transmitted by a base station, wherein the trigger message comprises instruction information, wherein the instruction information is used for instructing at least one UE in a group of UEs to transmit a sounding signal; and a transmitting module, configured to transmit the sounding signal to the base station according to the instruction information;

wherein the [user equipment further comprises a second] *first* receiving module[,] *is further* configured to receive a notification message transmitted by the base station simultaneous with[, before, or after the first receiving module receives] the trigger message transmitted by the base station, wherein the notification message comprises configuration information of a sounding signal resource; and *wherein the notification message and the trigger message are carried in one message; and* wherein the transmitting module is specifically configured to transmit the sounding signal to the base station on a sounding signal resource corresponding to the UE according to the instruction information, wherein the sounding signal resource corresponding to the UE is calculated by the UE based on the configuration information of the sounding signal resource according to an intra-group position or an intra-number of the UE.

9. The user equipment according to claim 8, wherein the trigger message is carried by a high layer signaling, and the high layer signaling comprises the instruction information; or the trigger message is carried by a physical downlink control channel (PDCCH) bearing downlink control information (DCI), wherein the DCI comprises the instruction information.

10. The user equipment according to claim 8, wherein the notification message is carried by a high layer signaling, and the high layer signaling comprises the configuration information; or the notification message is carried by a PDCCH bearing DCI, and the DCI comprises the configuration information.

11. The user equipment according to claim 8, wherein the transmitting module is configured to transmit the sounding signal to the base station by adopting a mode of occupying the sounding signal resource in a time division manner.

12. The user equipment according to claim 11, wherein the [second] *first* receiving module is also configured to receive a high layer signaling transmitted by the base station, wherein the high layer signaling comprises a transmitting sequence of the at least one UE occupying the sounding signal resource in the time division manner; and wherein the transmitting module is specifically configured to occupy the sounding signal resource in the time division manner and transmit the sounding signal to the base station according to the transmitting sequence.

13. A base station, comprising:

a triggering module, configured to transmit a trigger message to at least one user equipment (UE) in a group of UEs, wherein the trigger message comprises instruction information, and the instruction information is used for instructing the at least one UE to transmit a sounding signal; and a receiving module, configured to receive the sounding signal transmitted by the at least one UE according to the instruction information;

wherein the base station further comprises a notification module, configured to transmit a notification message to the at least one UE, wherein the notification message comprises configuration information of a sounding signal resource; and *wherein the notification message and the trigger message are carried in one message; and* wherein the receiving module is configured to receive the sounding signal transmitted by each UE in the group of UEs on the sounding signal resource corresponding to said each UE according to the instruction information, wherein the sounding signal resource corresponding to said each UE is calculated by said each UE based on the configuration information of the sounding signal resource according to an intra-group position or an intra-number of said each UE.

14. The base station according to claim 13, wherein the trigger message is carried by a high layer signaling, and the high layer signaling comprises the instruction information; or the trigger message is carried by a physical downlink control channel (PDCCH) bearing downlink control information (DCI), wherein the DCI comprises the instruction information.

15. The base station according to claim 13, wherein the receiving module is configured to receive the sounding signal transmitted by the at least one UE by adopting a mode of occupying the sounding signal resource in a time division manner.

16. The base station according to claim 15, wherein the notification module is also configured to transmit a high layer signaling to the at least one UE, wherein the high layer signaling comprises a transmitting sequence of the at least one UE occupying the sounding signal resource in the time division manner.

17. The method according to claim 1, wherein, the trigger message further comprises configuration information of a sounding signal resource;

wherein the transmitting the sounding signal to the base station according to the instruction information comprises transmitting the sounding signal to the base station on the sounding signal resource according to the instruction information.

18. The method according to claim 17, wherein the configuration information comprises a transmitting sequence of the at least one UE occupying the sounding signal resource in a time division manner;

wherein the transmitting the sounding signal to the base station by adopting the mode of occupying the sounding signal resource in the time division manner comprises occupying the sounding signal resource in the time division manner and transmitting the sounding signal to the base station according to the transmitting sequence.

19. The method according to claim 5, wherein, the trigger message further comprises configuration information of a sounding signal resource;

wherein the receiving the sounding signal transmitted by the at least one UE according to the instruction information comprises receiving the sounding signal transmitted by the at least one UE on the sounding signal resource according to the instruction information.

20. The user equipment according to claim 11, wherein the configuration information comprises a transmitting sequence of the at least one UE occupying the sounding signal resource in a time division manner; and wherein the transmitting module is configured to occupy the sounding signal resource in the time division manner and transmit the sounding signal to the base station according to the transmitting sequence.

21. The base station according to claim 13, wherein the trigger message further comprises configuration information of a sounding signal resource;

wherein the receiving module is configured to receive the sounding signal transmitted by the at least one UE on the sounding signal resource according to the instruction information.

22. The base station according to claim 21, wherein the configuration information further comprises a transmitting sequence of the at least one UE occupying the sounding signal resource in a time division manner.

*23. The method according to claim 1, wherein the configuration information of the sounding signal resource is an index of the sounding signal resource configuration.*

*24. The method according to claim 5, wherein the configuration information of the sounding signal resource is an index of the sounding signal resource configuration.*

*25. The user equipment according to claim 8, wherein the configuration information of the sounding signal resource is an index of the sounding signal resource configuration.*

*26. The base station according to claim 13, wherein the configuration information of the sounding signal resource is an index of the sounding signal resource configuration.*

* * * * *